(12) United States Patent
Lin (10) Patent No.: US 8,035,960 B2
(45) Date of Patent: Oct. 11, 2011

(54) HARD DISK DRIVE FRAME

(75) Inventor: Yu Ying Lin, Taipei (TW)

(73) Assignee: Moxa Inc., Shing Tien, Taipei County (TW)

( * ) Notice: Subject to any disclaimer, the term of this patent is extended or adjusted under 35 U.S.C. 154(b) by 192 days.

(21) Appl. No.: 12/591,570

(22) Filed: Nov. 24, 2009

(65) Prior Publication Data

US 2011/0122757 A1     May 26, 2011

(51) Int. Cl.
*G06F 1/16* (2006.01)

(52) U.S. Cl. ............... 361/679.33; 360/326; 428/800; 369/53.42; 710/74

(58) Field of Classification Search ............... 360/245.8, 360/31, 122, 326, 97.02, 78.04; 428/64, 428/856.9, 800, 201, 813; 369/247.1, 13.17, 369/53.42, 44.23; 345/173, 175; 710/14, 710/74; 361/679.01, 679.08, 679.09, 679.33, 361/679.48, 679.39, 679.27, 679.26, 679.4, 361/679.37, 679.35

See application file for complete search history.

(56) References Cited

U.S. PATENT DOCUMENTS

| | | | |
|---|---|---|---|
| 2007/0120999 A1* | 5/2007 | Hara | 348/373 |
| 2009/0040712 A1* | 2/2009 | Hoshi et al. | 361/685 |

\* cited by examiner

*Primary Examiner* — Hung Duong
(74) *Attorney, Agent, or Firm* — Bacon & Thomas, PLLC (57) ABSTRACT

A hard disk drive frame is provided. The distances from its hard disk drive fixing parts to the substrate center are not the same. During the process of vibrational energy transfer, three-dimensional reactions are induced correspondingly to cancel the kinetic energy transfer. The reactions generated at the static balance point in the three dimensions interfere one another to destroy vibrational frequencies in specific directions. Therefore, the disclosed hard disk drive is resistant to vibrations and suffers less from the resonance effect.

15 Claims, 10 Drawing Sheets

HARD DISK DRIVE FRAME

BACKGROUND OF THE INVENTION

1. Field of Invention

The invention relates to a hard disk drive (HDD) frame and, in particular, to a HDD frame in which the distances from its hard disk drive fixing parts to the substrate center are not the same. During the transfer process of vibrational energy, three-dimensional reactions are induced correspondingly to cancel the kinetic energy transfer. The reactions generated at the static balance point in the three dimensions interfere one another to destroy vibrational frequencies in specific directions. Therefore, the disclosed hard disk drive is resistant to vibrations and suffers less from the resonance effect.

2. Related Art

In recent years, rapid development in information and computer industries have facilitate the combination between computers and life. In addition to playing the role of data storage, the HDD is also used to boot the operating system (OS) of modern computers.

Since the pickup head of the HDD requires precision positioning in order to accurately read out the data, its user should avoid collisions of the HDD. Otherwise, the vibration may make the pickup head lose its precision or even damage data on the HDD.

However, the HDD in a normal computer cannot be free from vibrations. Industrial computers have particularly bad environments. Not only does the HDD have a shorter lifetime in a vibrational environment for a long time, it may break down in this case.

Therefore, most of the vibration-proof designs use vibration absorbing elements at the parts that fix the HDD, thereby absorbing vibrations generated by external forces. However, such a method can only absorb the external force in one direction, which is along the fixing axis of the HDD. It cannot simultaneously external forces in all directions. So its anti-vibration effect is very limited.

Consequently, some people suggest to use a HDD frame and to add vibration absorbing elements at all the fixing parts of the HDD frame in order to absorb forces from all directions. However, this method uses so many elements that it is not cost-effective and the assembly is more complicated.

Besides, the HDD frame is generally designed to have some line symmetry. That is, the HDD frame has a symmetrical axis; it is left-right symmetric. Such a design enables the vibrational energy to transfer in a symmetric way. The reactions induced at the static balance point in three directions do not interfere with one another. Therefore, the vibrational frequencies in specific directions cannot be destroyed. When a resonance happens, the HDD cannot be really free from vibrations.

In summary, the prior art always has the problem that existing HDD frame and vibration absorbing elements cannot avoid resonance. It is thus imperative to provide a better solution.

SUMMARY OF THE INVENTION

In view of the foregoing, the invention discloses a HDD frame. According to the invention, the HDD is fixed on the HDD frame before it is mounted on a fixed body. The disclosed HDD frame includes: a substrate, four substrate fixing parts, and two HDD fixing parts; wherein the substrate further has a first extending part and a second extending part.

The substrate has front and rear end surfaces and left and right side surfaces. The first extending part extends from the front end surface of the substrate. The horizontal length of the first extending part is defined as the first length. The second extending part extends from the rear end surface of the substrate. The horizontal length of the second extending part is defined as the second length. The first length and the second length are different. The four substrate fixing parts are extended from the two ends of the first extending part and the two ends of the second extending part. The extending lengths of the four substrate fixing parts are all different. The four substrate fixing parts are to be fixed on the fixed body. The two HDD fixing parts are disposed on the left and right side surfaces of the substrate, respectively. The HDD is fixed between the two HDD fixing parts.

Since the horizontal length of the first extending part (i.e., the first length) and the horizontal length of the second extending part (i.e., the second length) are not the same and the extending lengths of the four substrate fixing parts are all different, the lengths from the four substrate fixing parts to the center of the substrate are also all different. The HDD frame is not line symmetric or point symmetric.

Now consider the vibrational energy transfer via the four substrate fixing parts in this design. As the lengths from the four substrate fixing parts to the substrate center are all different, the reactions induced at the static balance point in the three directions interfere with one another to destroy the vibrational frequencies in specific directions. In addition to absorbing vibrations, the HDD frame can further prevent the resonance effect.

The first extending part can extend from the front end surface of the substrate in an oblique or horizontal way. Likewise, the second extending part can extend from the rear end surface of the substrate in an oblique or horizontal way. Besides, the extension positions of the first extending part and the second extending part are both either higher or lower than the substrate.

The two HDD fixing parts are disposed on the left and right side surfaces of the substrate. In a first embodiment, the HDD fixing parts extend from the left and right side surfaces of the substrate, respectively. The HDD fixing part and the substrate are integrally formed. The positions of the HDD fixing parts are higher than the substrate. In a second embodiment, the left and right side surfaces of the substrate are extended with extended fixing parts. The HDD fixing part consists of a fixing board and two vibration absorbing elements. The fixing board of the HDD fixing part has two first fixing parts and two second fixing parts. The first fixing part of the fixing board is used to fix the HDD. The second fixing part is used to fix the two vibration absorbing elements. The vibration absorbing elements fix the HDD fixing part to the extended fixing part. The HDD fixing part is thus disposed on the left and right side surfaces of the substrate, and the positions of the extended fixing parts are higher than the substrate.

As described above, the disclosed HDD frame differs from the prior art in that the distances of its HDD fixing parts to the substrate center are not equal. Using this configuration, reactions in all three dimensions are produced to cancel the vibrational energy transfer. The reactions induced at the static balance point in the three dimensions interfere with one another to destroy the vibrational frequencies in specific directions. In addition to provide a better vibration absorbing effect, the disclosed HDD frame can prevent the resonance effect.

Using the disclosed technique, the disclosed HDD frame achieves the effects of reduce vibrations and avoid resonance.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The following paragraphs explain a first embodiment of the HDD frame. Please refer to FIG. 1 for a three-dimensional view of the first embodiment.

Figure 1:
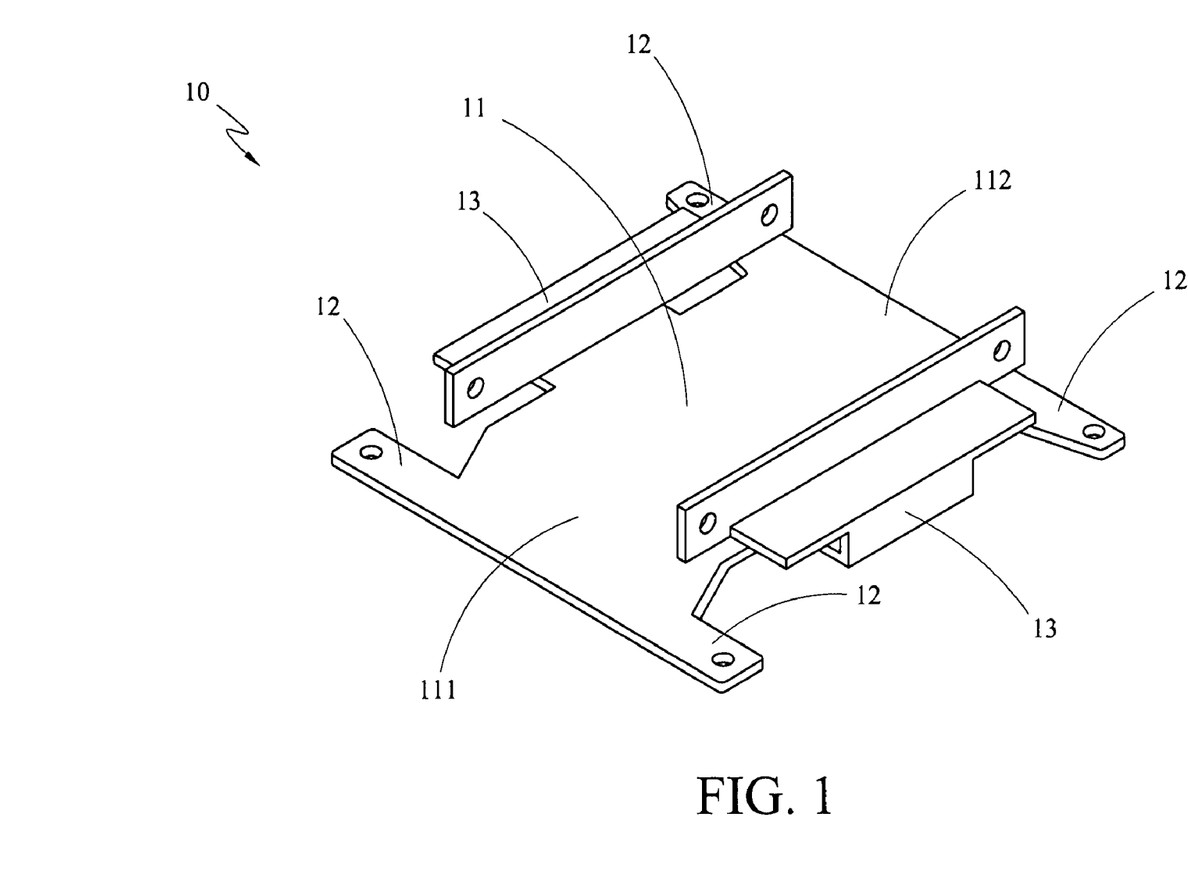
FIG. 1 is a three-dimensional view of a first embodiment of the disclosed HDD frame.

In this embodiment of the HDD frame 10, the HDD 20 (see FIG. 2) is fixed thereon and then to a fixed body (not shown). The fixed body can be a motherboard, computer case, etc. Such examples should not be used to limit the scope of the invention. The HDD frame 10 includes: a substrate 11, four substrate fixing parts 12, and two HDD fixing parts 13; wherein the substrate 11 further includes a first extending part 111 and a second extending part 112.

The substrate 11 is a flat board made of some rigid material. It has front and rear end surfaces and left and right side surfaces. The first extending part 111 of the substrate 11 extends from the front end surface thereof, and the second extending part 112 of the substrate 11 extends from the front end surface thereof. Moreover, the horizontal length of the first extending part 111 from the front end surface of the substrate 11 is defined as a first length, and the horizontal length of the second extending part 112 from the rear end surface of the substrate 11 is defined as a second length.

It should be noted that the first length (i.e., the horizontal length of the first extending part 111 from the front end surface of the substrate 11) and the second length (i.e., the horizontal length of the second extending part 112 from the rear end surface of the substrate 11) are different.

The four substrate fixing parts 12 fix the HDD frame 10 on the fixed body, thereby firmly holding the HDD frame 10. The four substrate fixing parts 12 extend from the two ends of the first extending part 111 and the two ends of the second extending part 112, respectively. It should be emphasized that the extended lengths of the substrate fixing parts 12 are all different.

Since the first length and the second length are different and the extended lengths of the substrate fixing parts 12 are all different, the lengths from the fourth substrate fixing parts 12 to the center of the substrate 11 are thus different. Therefore, the HDD frame 10 has a non-line symmetric and non-point symmetric design.

The two HDD fixing parts 13 are disposed on the left and right side surfaces of the substrate 11. They extend from the left and right side surfaces of the substrate 11, so that the two HDD fixing parts 13 and the substrate 11 are integrally formed. It is worth mentioning that the positions of the two HDD fixing parts 13 are higher than the position of the substrate 11.

The two HDD fixing parts 13 hold the HDD 20 between the two HDD fixing parts 13, thereby fixing the HDD 20. Since the positions of the two HDD fixing parts 13 are higher than the position of the substrate 11, the HDD 20 looks floated between the two HDD fixing parts 13. That is, the HDD 20 is only fixed to the two HDD fixing parts 13 and does not directly touch the substrate 11.

Figure 2:
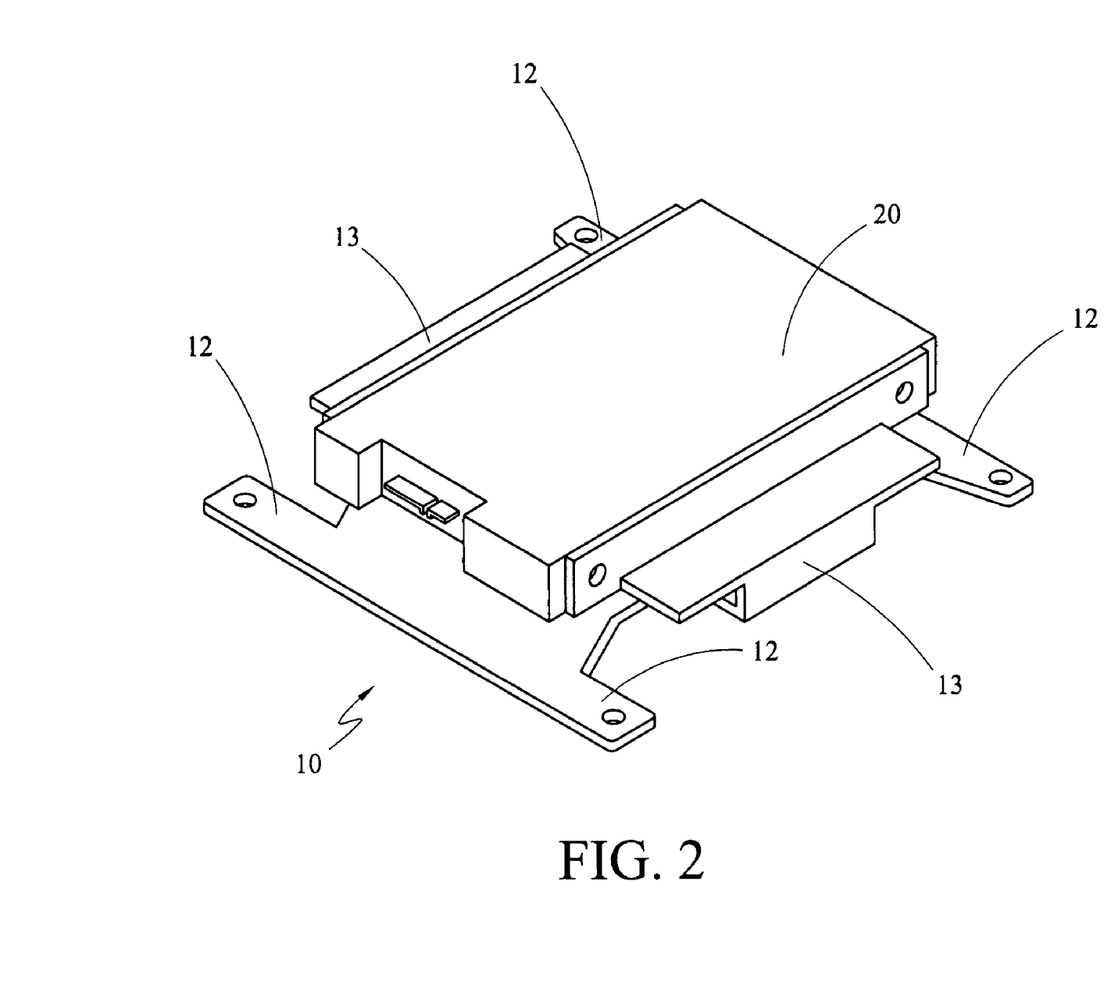
FIG. 2 is a three-dimensional schematic view of the first embodiment in use.

Using this configuration, the HDD 20 is fixed on the fixed body (not shown) via the HDD frame 10, as shown in FIG. 2, which is a three-dimensional view of the first embodiment in use.

Figure 3:
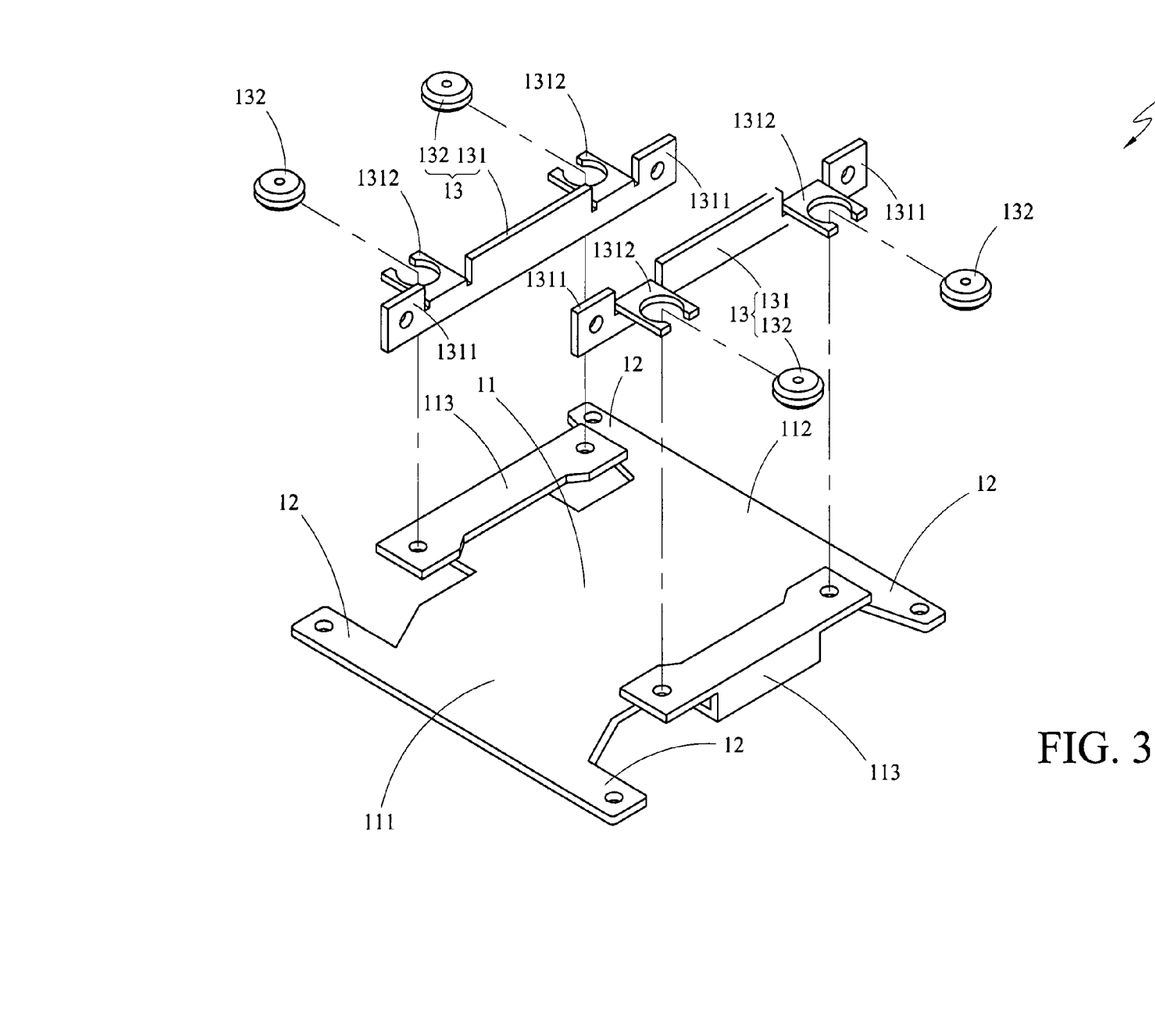
FIG. 3 is a three-dimensional exploded view of a second embodiment of the disclosed HDD frame.

The following paragraphs describe a second embodiment of the disclosed HDD frame. Please simultaneously refer to FIGS. 1 and 3. FIG. 3 is a three-dimensional exploded view of the second embodiment.

In the second embodiment of the disclosed HDD frame 10, the HDD 20 (see FIG. 5) is fixed on the HDD frame 10 and then fixed to the fixed body (not shown). The HDD frame 10 includes: a substrate 11, four substrate fixing parts 12, and two HDD fixing parts 13; wherein the substrate 11 further includes a first extending part 111 and a second extending part 112.

The second embodiment differs from the first embodiment in the two HDD fixing parts 13. The first extending part 111, the second extending part 112, and the four substrate fixing parts 12 in this embodiment are no different from the first embodiment. Thus, the details of the first extending part 111 and the second extending part 112 of the substrate 11 and the fourth substrate fixing parts 12 are the same as the first embodiment and are not repeated here again.

In the first embodiment, the two HDD fixing parts 13 extend from the left and right side surfaces of the substrate 11 so that the two HDD fixing parts 13 and the substrate 11 are integrally formed. In the second embodiment, each of the HDD fixing parts 13 consist of a fixing board 131 and two vibration absorbing elements 132. The HDD fixing part consisted of the fixing board 131 and the two vibration absorbing elements 132 is then disposed on the left and right side surfaces of the substrate 11, respectively. That is, the HDD fixing part 13 is assembled together.

The fixing board 131 in the HDD fixing part 13 is made of some rigid material and the fixing board 131 has two first fixing parts 1311 and two second fixing parts 1312. The first fixing parts 1311 of the fixing board 131 are used to fix the HDD 20. The second fixing parts 1312 of the fixing board 131 are used to fix the vibration absorbing elements 132. The left and right side surfaces of the substrate 11 are extended with an extended fixing part 113, respectively. The extended fixing parts 113 extended from the left and right side surfaces of the substrate 11 are used to fix the HDD fixing part 13. The HDD fixing parts 13 are then fixed on the extended fixing parts 113 extended from the left and right side surfaces of the substrate 11 via the vibration absorbing elements 132 on the second fixing parts 1312 of the fixing board 131. The HDD fixing parts 13 are thus disposed on the left and right side surfaces of the substrate 11 via the extended fixing parts 113. It should be noted that the positions of the extended fixing parts 113 extended from the left and right side surfaces of the substrate 11 are higher than the position of the substrate 11. That is, the positions of the HDD fixing parts 13 are higher than that of the substrate 11.

Figure 4:
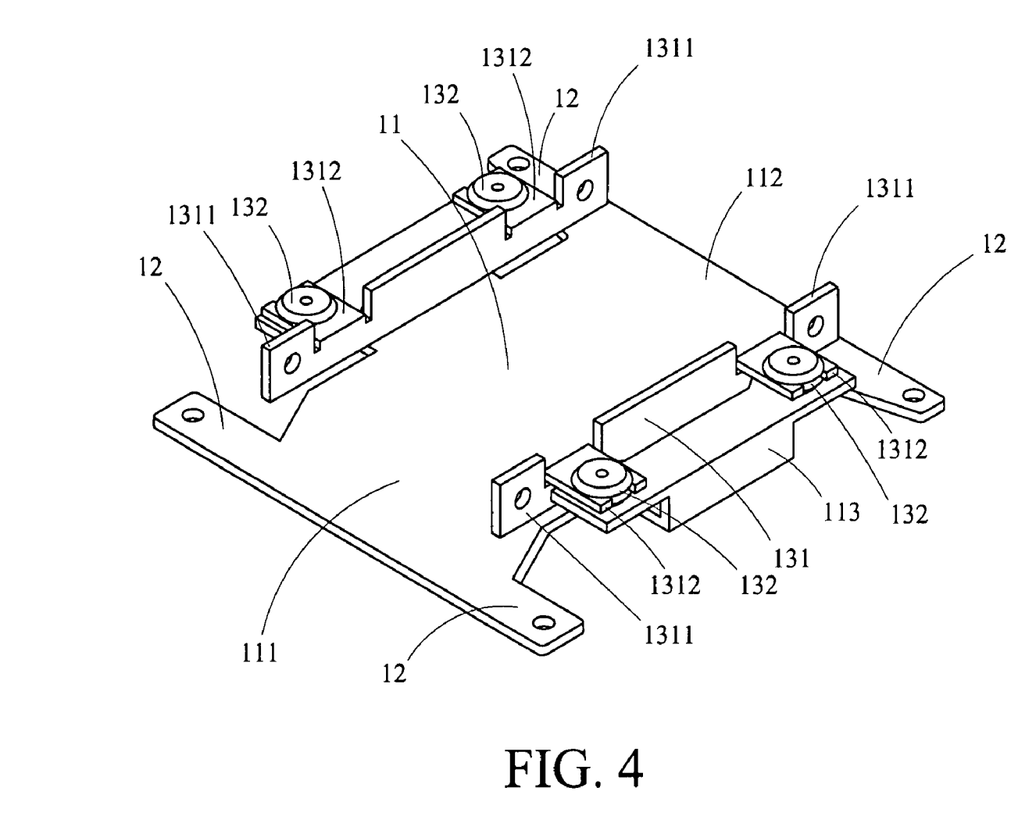
FIG. 4 is a three-dimensional view of the assembled second embodiment.

The HDD fixing part 13 obtained by combining the vibration absorbing elements 132 and the fixing board 131 is fixed on the extended fixing parts 113 extended from the left and right side surfaces of the substrate 11. The assembled result is shown in FIG. 4, which shows the three-dimensional view of the second embodiment.

Figure 5:
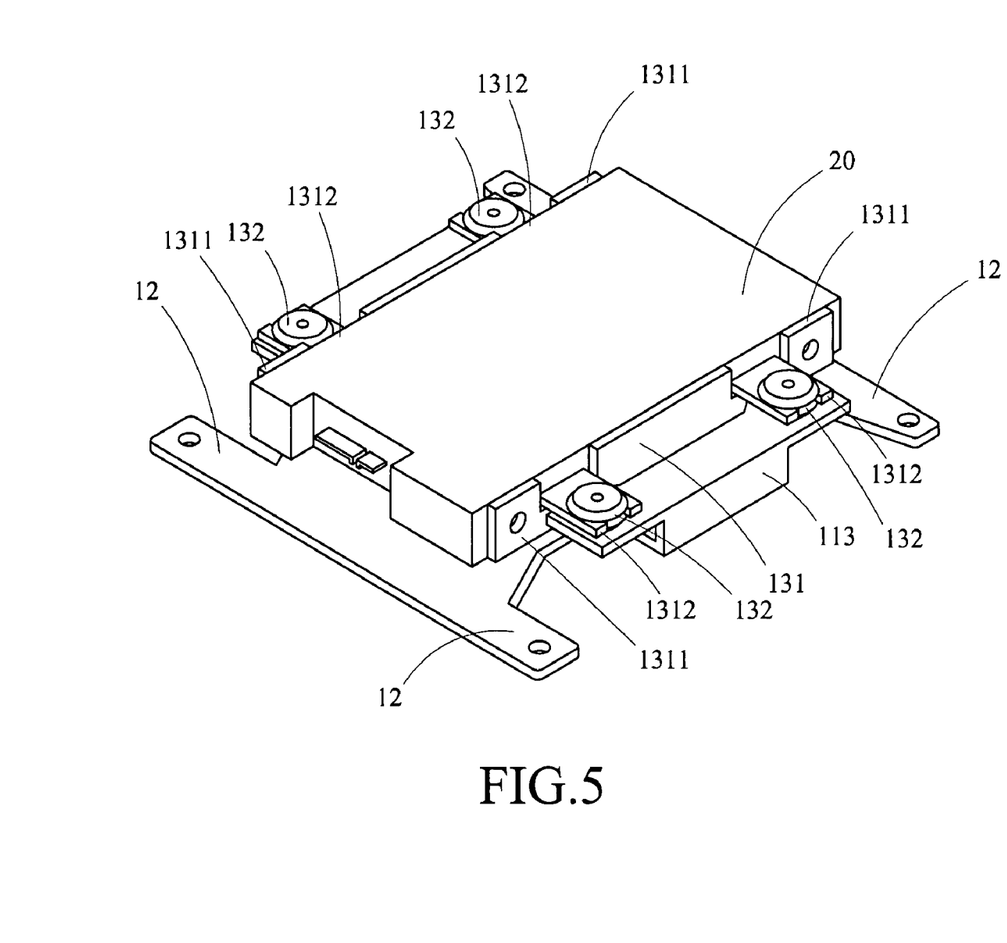
FIG. 5 is a three-dimensional view of the second embodiment in use.

Therefore, the HDD 20 is fixed on the HDD frame 10 via the HDD fixing parts 13. The combination is then fixed on the fixed body (not shown). FIG. 5 shows a three-dimensional view of the second embodiment of the disclosed HDD frame.

The vibration absorbing element 132 is made of a flexible material. For example, it is made of rubber, epoxy resin, etc. These examples should not be used to restrict the scope of the invention though. Since the vibration absorbing elements 132 are flexible, they are fixed onto the second fixing parts 1312 of the fixing board 131 by clipping. Again, the combining method mentioned here is only an example, and should not limit the scope of the invention.

As mentioned above, the vibration absorbing elements 132 are fixed on the extended fixing parts 113 on both side surfaces of the substrate 11. In both first and second embodiments, the four substrate fixing parts are fixed on the fixed body. The drawing shows that the fixing is achieved with screws, which is only an example and should not be used to restrict the scope of the invention. All existing fixing method should be included in the invention.

Figure 6:
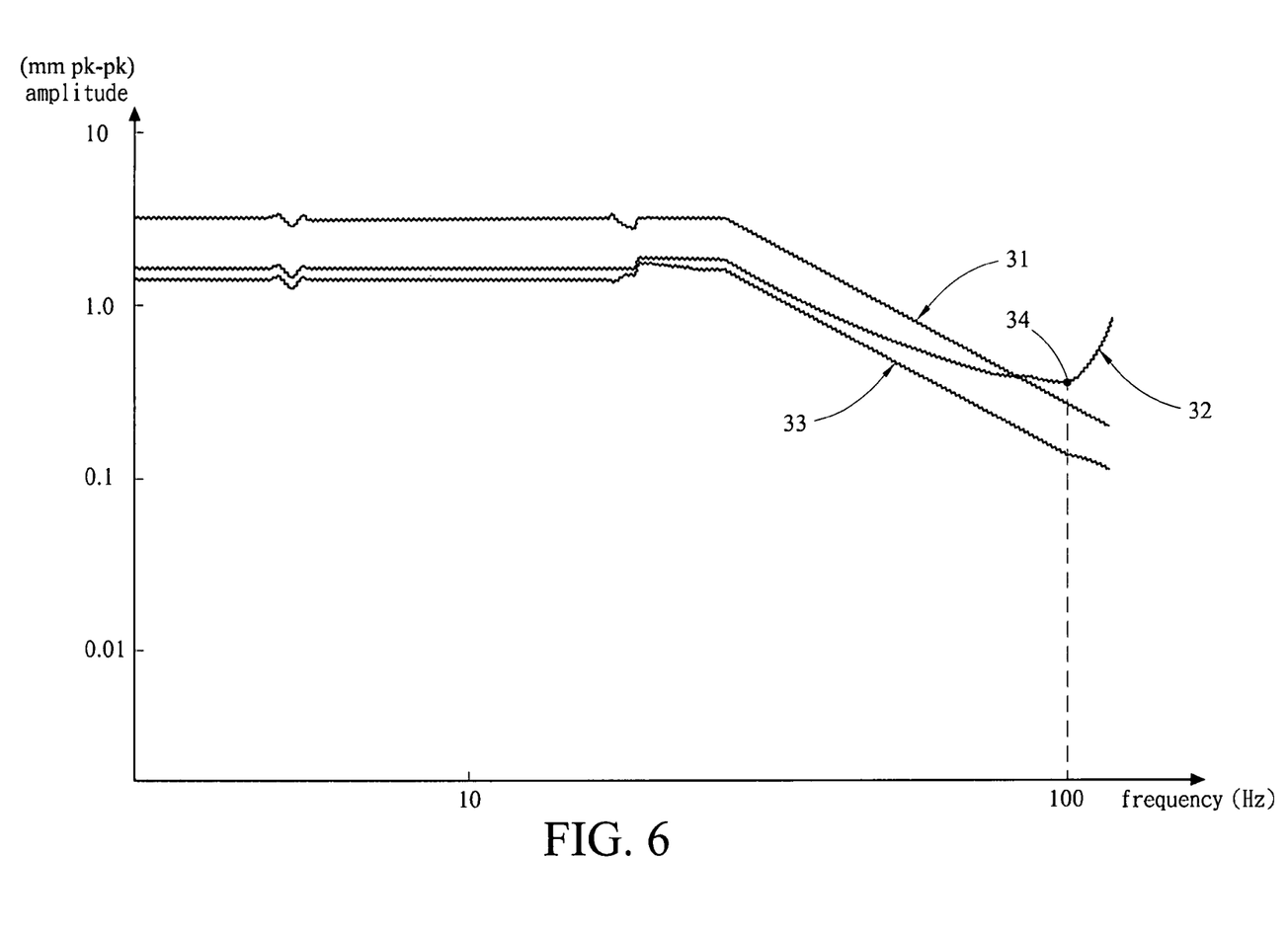
FIG. 6 shows curves in the vibration experiment of the second embodiment.
Figure 7A:
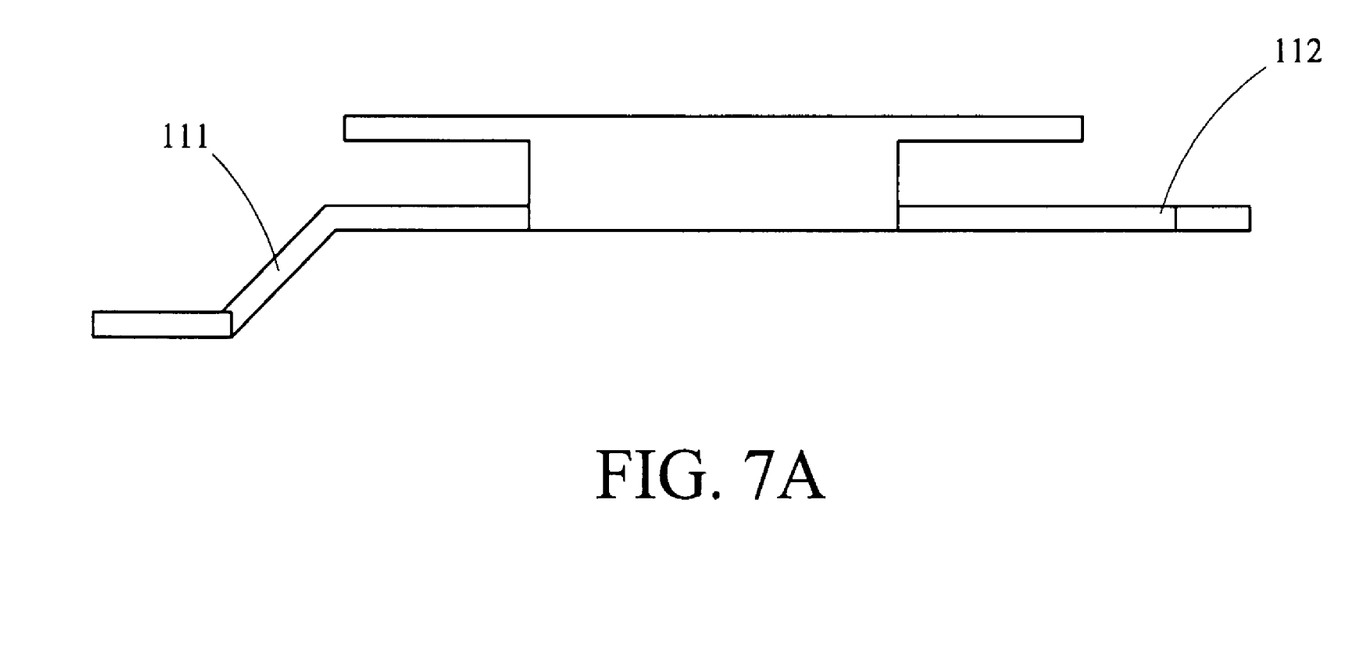
FIGS. 7A to 7D are schematic side views of the first extending part and the second extending part in the disclosed HDD frame.
Figure 7B:
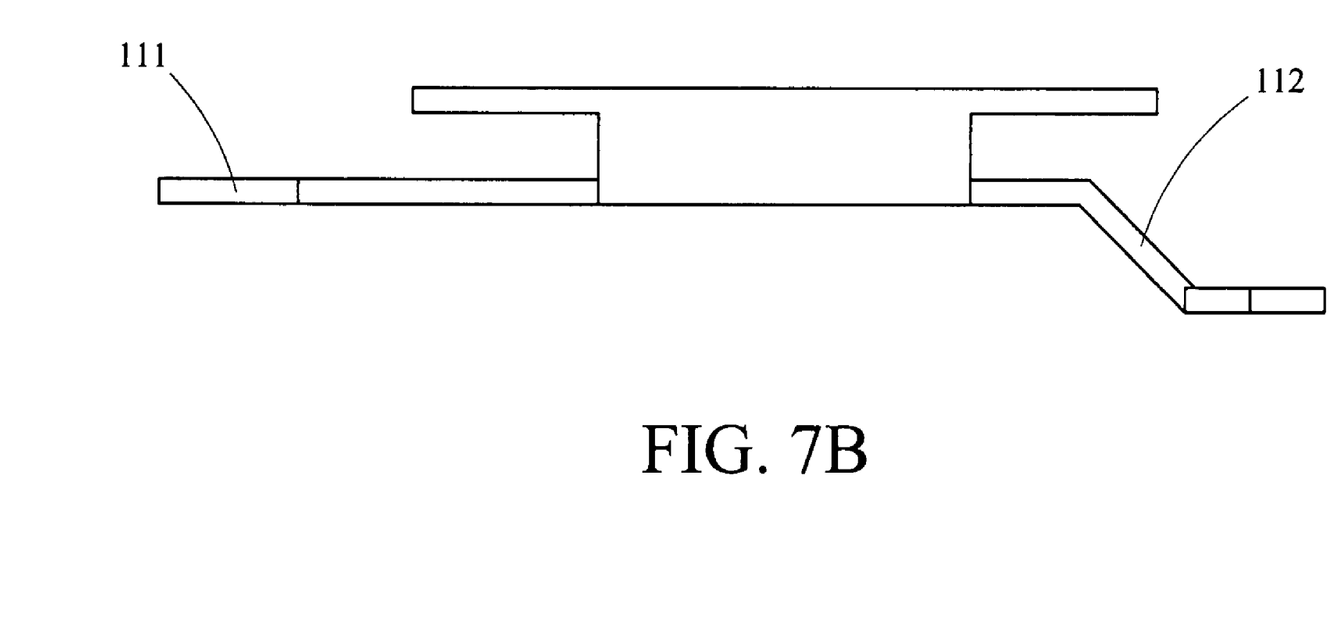
Figure 7C:
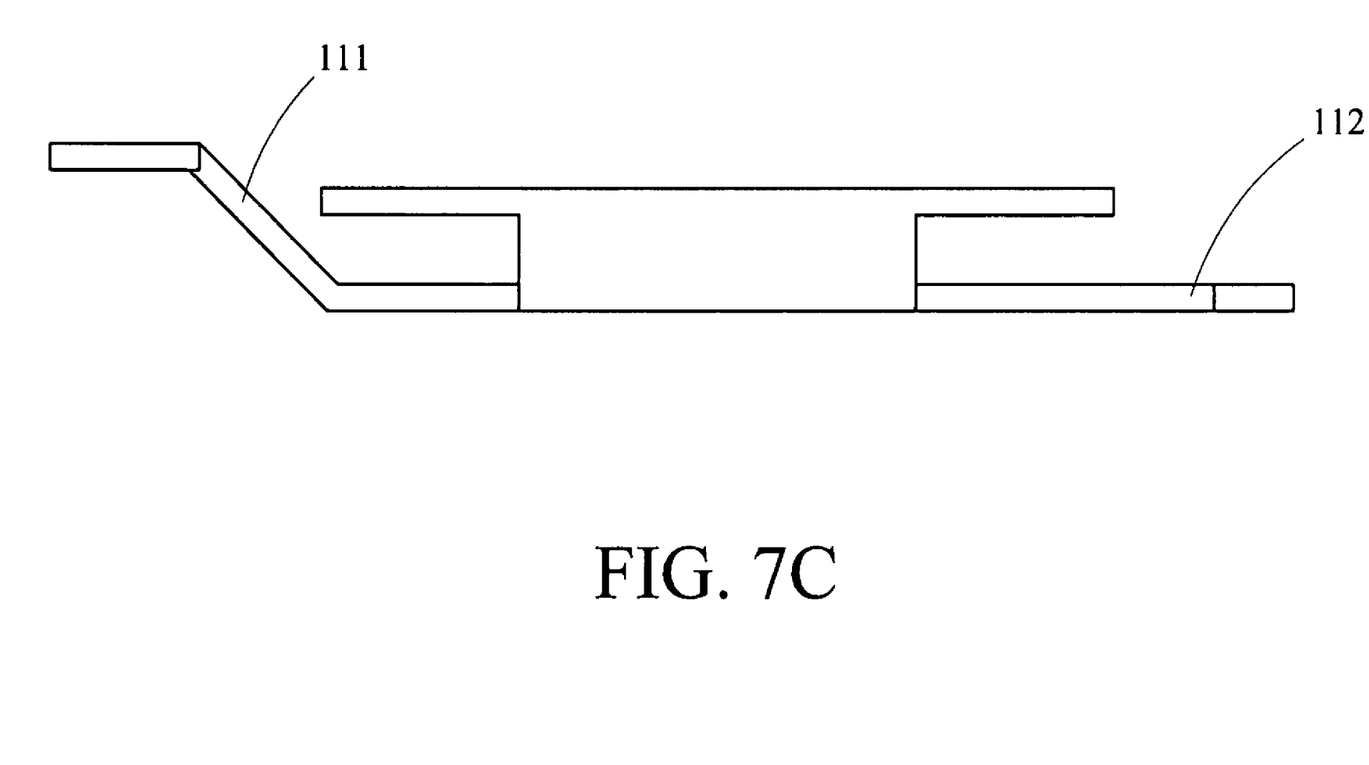
Figure 7D:
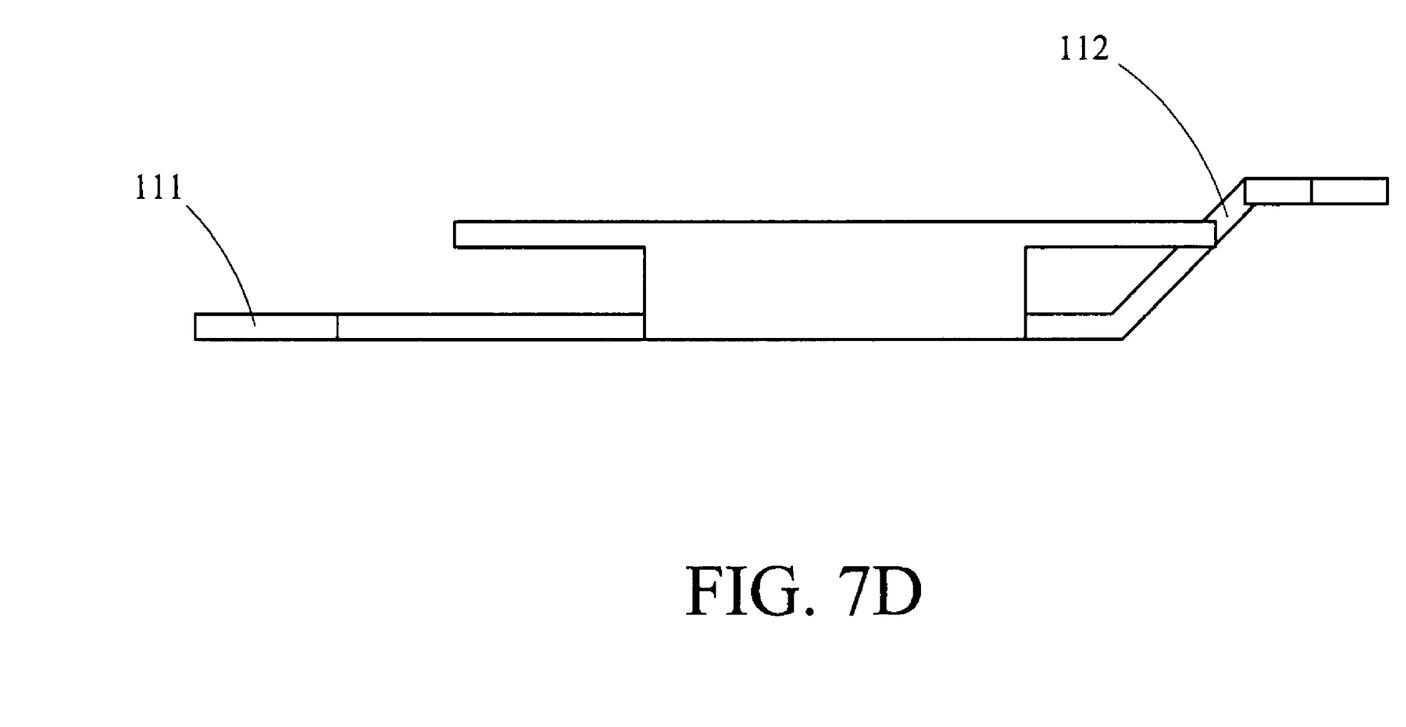

Please simultaneously refer to FIGS. 5 and 6. FIG. 6 shows curves obtained in vibration experiments using the second embodiment of the HDD frame. This specification only uses the second embodiment as an example to show the experimental results of the invention. This is only to show the effects that can be achieved by the invention. The other embodiments can also achieve the same effects, only slightly differing in the numerical data.

The disclosed HDD frame 10 has different values for the horizontal length of the first extending part (i.e., the first length) and the horizontal length of the second extending part (i.e., the second length). Also, the extended lengths of the four substrate fixing parts are all different. As a result, the distances from the four substrate fixing parts to the center of the substrate are all different. The HDD frame thus has a non-line symmetric or non-point symmetric design.

According to the disclosed design, during the process of vibrational energy transfer, reactions generated at the static balance point in the three dimensions interfere one another to destroy vibrational frequencies in specific directions. This is because the distances from the four substrate fixing parts to the substrate center are all different. Therefore, the disclosed HDD is resistant to vibrations and suffers less from the resonance effect.

In the second embodiment, the positions of the extended fixing parts 113 are higher than the position of the substrate 11 and the HDD fixing parts include vibration absorbing elements 132 made of a flexible material. Thus, the nature of the flexible material absorbs the energy to be transferred to the HDD 20. This prevents the center of the substrate from accumulating too much energy and resulting in vibrations. Therefore, the disclosed HDD frame 10 can resist vibrations.

As shown in FIG. 6, the vibration experiments on the HDD frame 10 and the HDD 20 are performed according to the DNV 2.4 Class B verification standards. The horizontal axis in the drawing is the vibration frequency, and the vertical axis is the vibration amplitude. The first curve 31 in FIG. 6 is the vibration energy provided from a vibration base to the test subject (i.e., the HDD frame 10 and the HDD 20). The second curve 32 in the drawing is the vibration at one test point on the print circuit board assembly (PCBA) of the entire system. The third curve 33 in the drawing indicates the vibrations at the center on the front surface of the HDD 20.

In the first part of the experiment, the energy is increasing. This is the approximately horizontal section in the drawing, even though the energy scale is not shown. The horizontal expansion indicates that the energy is increasing. Moreover, the acceleration in the first part of the vibration experiment goes from 0.06 g's rms to 2.84 g's rms.

The first curve 31 of the experiment starts from the low-frequency low-energy input. That is, the vibrational energy provided to the HDD frame 10 and the HDD 20 starts from low frequencies and low energy. The third curve 33 is lower than the first curve 31 and the second curve 32. That is, the force experienced by the HDD 20 is far less than the force experienced by the vibration base. The force experienced by the HDD 20 is also less than the force at the PCBA test point. During the process of vibrational energy transfer, reactions generated at the static balance point in the three dimensions interfere one another to destroy vibrational frequencies in specific directions. Therefore, the disclosed HDD 20 is indeed protected by the HDD frame 10 from vibrations.

In the second part of the experiment, the energy output is constant. This is the part where curves drop. In this part, the acceleration is maintained at 4 g's rms. It is used to verify the relation between the frequency and the amplitude at the PCBA and the HDD 20.

The energy of the first curve 31 in this experiment starts from the constant acceleration of 4 g's rms. At the same time, the third curve 33 is still lower than the first curve 31 and the second curve 32. That is, the force experienced by the HDD 20 is far less than the force experienced by the vibration base. The force experienced by the HDD 20 is also less than the force at the PCBA test point.

When the vibration frequency approaches 100 Hz, the second curve 32 has an obvious rising behavior after the turning point 34. This means that the PCBA has reached the resonance at the vibration frequency 100 Hz provided by the vibration base. Although the vibration base sends out only the energy of 4 g's rms, the test point of the PCBA is detected to have the high energy of 8.98 g's rms (a factor of two higher than the vibration base). However, the HDD 20 has only a small energy of 1.42 g's rms. During the process of transferring vibrational energy, the reactions induced at the static balance point in the three directions interfere with one another to destroy the frequencies in specific directions. The HDD 20 is thus protected by the HDD frame 10 to experience less vibrations and no resonance effect.

When the HDD 20 is not protected by the HDD frame 10, the HDD 20 will also experience the same resonance effect. Near 100 Hz, the force experienced by the HDD 20 will exceed its allowed range. This could result in damages to the HDD 20, greatly lowering the applications and reliability thereof.

People usually think that the test object (i.e., the HDD 20) may be able to withstand the energy of 4 g's rms. However, since the entire system may have resonance, the test object (i.e., the HDD 20) under some conditions may already exceed the force experienced by the entire system and have big damages. Therefore, the disclosed HDD frame 10 can be resistant to vibrations and immune from the resonance effect.

Please refer to FIGS. 7A to 7D, which are schematic side views of the first extending part and the second extending part of the disclosed HDD frame.

The first extending part 111 extends from the front end surface of the substrate 11. It can be extended in an oblique direction or horizontally. The second extending part 112 extends from the rear end surface of the substrate 11. It can be extended in an oblique direction or horizontally. The positions of the first extending part 111 and the second extending part 112 can be either higher or lower than the position of the substrate 11 for fixing different fixed bodies (not shown). The first extending part 111 and the second extending part 112 mentioned here are only examples of the invention, and should not be used to restrict the scope thereof. In other words, the first extending part 111 and the second extending part 112 can be arbitrarily combined for fixing different fixed bodies. These extension embodiments are subject to the constraints that the first length and the second length are different and that the lengths of the four substrate fixing parts 12 from the substrate center are all different. The extension embodiments are shown in FIGS. 7A to 7D.

In summary, the invention differs from the prior art in that the distances form the HDD fixing parts of the disclosed HDD frame to the substrate center are different. Using this configuration, reactions in all three dimensions are produced to cancel the vibrational energy transfer. The reactions induced, at the static balance point in the three dimensions interfere with one another to destroy the vibrational frequencies in specific directions. In addition to provide a better vibration absorbing effect, the disclosed HDD frame can prevent the resonance effect.

The disclosed technique can be used to solve the problem that the existing HDD using the HDD fixing board and vibration absorbing elements to absorb vibrations cannot fully eliminate the resonance effect. The invention can be resistant to vibrations and avoid the resonance effect.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A hard disk drive (HDD) frame for fixing a HDD thereon and then on a fixed body, comprising:
   a substrate, which has a front end surface, a rear end surface, a left side surface, and a right side surface, and further includes:
      a first extending part, which extends from the front end surface of the substrate, with its extended horizontal length defined as a first length; and
      a second extending part, which extends from the rear end surface of the substrate, with its extended horizontal length defined as a second length, wherein the second length and the first length are not the same;
   four substrate fixing parts, which extend from the two ends of the first extending part and the two ends of the second extending part in different lengths, respectively, for connections with the fixed body; and
   two HDD fixing parts, which are disposed on the left and right side surfaces of the substrate, respectively, for fixing the HDD between the HDD fixing parts.

2. The HDD frame of claim 1, wherein the first extending part extends from the front end surface of the substrate in an oblique or horizontal way.

3. The HDD frame of claim 1, wherein the second extending part extends from the rear end surface of the substrate in an oblique or horizontal way.

4. The HDD frame of claim 1, wherein the position of the first extending part is higher than the position of the substrate.

5. The HDD frame of claim 1, wherein the position of the first extending part is lower than the position of the substrate.

6. The HDD frame of claim 1, wherein the position of the second extending part is higher than the position of the substrate.

7. The HDD frame of claim 1, wherein the position of the second extending part is lower than the position of the substrate.

8. The HDD frame of claim 1, wherein the HDD fixing parts extend from the left and right side surfaces of the substrate so that the HDD fixing parts and the substrate are integrally formed.

9. The HDD frame of claim 8, wherein the positions of the HDD fixing parts are higher than the position of the substrate.

10. The HDD frame of claim 1, wherein the left and right side surfaces of the substrate are extended with an extended fixing part, respectively; the extended fixing parts are used to fix the HDD fixing parts so that the HDD fixing parts are on the left and right side surfaces of the substrate.

11. The HDD frame of claim 10, wherein the positions of the extended fixing parts are higher than the position of the substrate.

12. The HDD frame of claim 10, wherein each of the HDD fixing parts consists of a fixing board and two vibration absorbing elements; the fixing board has two first fixing parts and two second fixing parts; the first fixing parts are used to fix the HDD and the second fixing parts are used to fix the vibration absorbing elements; and the vibration absorbing elements are fixed on the extended fixing parts.

13. The HDD frame of claim 12, wherein the fixing board is made of a rigid material and the vibration absorbing elements are made of a flexible material.

14. The HDD frame of claim 1, wherein the substrate is made of a rigid material.

15. The HDD frame of claim 1, wherein the lengths of the substrate fixing parts to the substrate center are all different.

* * * * *